United States Patent
Li et al.

(10) Patent No.: US 12,513,618 B2
(45) Date of Patent: Dec. 30, 2025

(54) METHOD FOR SECONDARY CELL DORMANCY INDICATION AND COMMUNICATION DEVICE

(71) Applicant: VIVO MOBILE COMMUNICATION CO., LTD., Dongguan (CN)

(72) Inventors: Dongru Li, Dongguan (CN); Xueming Pan, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 487 days.

(21) Appl. No.: 17/740,339

(22) Filed: May 9, 2022

(65) Prior Publication Data

US 2022/0279439 A1    Sep. 1, 2022

Related U.S. Application Data

(63) Continuation of application No. PCT/CN2020/135119, filed on Dec. 10, 2020.

(30) Foreign Application Priority Data

Dec. 17, 2019 (CN) .......................... 201911302931.6

(51) Int. Cl.
*H04W 52/02* (2009.01)

(52) U.S. Cl.
CPC .............................. *H04W 52/0212* (2013.01)

(58) Field of Classification Search
CPC ............. H04W 52/02; H04W 52/0212; H04W 52/0235
See application file for complete search history.

(56) References Cited

U.S. PATENT DOCUMENTS

| | | | |
|---|---|---|---|
| 2019/0190682 A1 | 6/2019 | Kadiri et al. | |
| 2021/0014837 A1* | 1/2021 | Papasakellariou | H04L 5/0053 |
| 2021/0176012 A1* | 6/2021 | Xu | H04W 72/23 |
| 2022/0399982 A1* | 12/2022 | Nory | H04W 72/0453 |

FOREIGN PATENT DOCUMENTS

| | | |
|---|---|---|
| CN | 109963296 A | 7/2019 |
| CN | 110381569 A | 10/2019 |
| CN | 110519853 A | 11/2019 |

OTHER PUBLICATIONS

International Search Report issued in corresponding International Application No. PCT/CN2020/135119, mailed Mar. 10, 2021, 4 pages.

(Continued)

*Primary Examiner* — Wayne H Cai
(74) *Attorney, Agent, or Firm* — IPX PLLC (57) ABSTRACT

The embodiments of the present disclosure provide a method for a secondary cell dormancy indication and a communication device, the method including: transmitting first DCI, an information field in the first DCI being used for carrying a dormancy indication, the dormancy indication being used for providing a secondary cell dormancy indication on a per-secondary cell basis or on a per-secondary cell group basis, and the information field including a scheduling-related field.

16 Claims, 3 Drawing Sheets

(56) References Cited

OTHER PUBLICATIONS

Ericsson, "Summary#4 of efficient and low latency serving cell configuration/activation/setup", 3GPP TSG-RAN WG1 #99 R1-1913549, Nov. 2019.
Apple Inc., "PDCCH based power saving channel design for UE power saving", 3GPP TSG RAN WG1 #99 R1-1912827, Nov. 2019.
First Office Action issued in related Chinese Application No. 201911302931.6, mailed Sep. 30, 2021, 10 pages.
Ericsson, "Summary#3 of efficient and low latency serving cell configuration/activation/setup", 3GPP TSG-RAN WG1 #99 R1-1913482, Nov. 2019.
Ericsson, "Summary#2 of efficient and low latency serving cell configuration/activation/setup", 3GPP TSG-RAN WG1 #99 R1-1913443, Nov. 2019.
Second Office Action issued in related Chinese Application No. 201911302931.6, mailed Feb. 28, 2022, 12 pages.

\* cited by examiner

METHOD FOR SECONDARY CELL DORMANCY INDICATION AND COMMUNICATION DEVICE

CROSS-REFERENCE TO RELATED APPLICATION

This application is a continuation of International Application No. PCT/CN2020/135119, filed Dec. 10, 2020, which claims priority to Chinese Patent Application No. 201911302931.6, filed Dec. 17, 2019. The entire contents of each of the above-referenced applications are expressly incorporated herein by reference.

TECHNICAL FIELD

The present disclosure relates to the field of communications technologies, and in particular, to a method for a secondary cell dormancy indication and a communication device.

BACKGROUND

In some communication systems, a dormancy behavior is introduced to improve the power-saving effect of communication devices. For example, the dormancy behavior is defined as a dormant state in an LTE-Advance (LTE-A) system, and the dormancy behavior is defined as a dormancy like behavior in a New Radio (NR) system. However, existing communication systems do not support dormancy indication through Downlink Control Information (DCI), resulting in a poor power-saving effect of the communication devices.

SUMMARY

According to a first aspect, the embodiments of the present disclosure provide a method for a secondary cell dormancy indication, applicable to a communication device, the method including:
  transmitting first DCI, an information field in the first DCI being used for carrying a dormancy indication, the dormancy indication being used for providing a secondary cell dormancy indication on a per-secondary cell basis or on a per-secondary cell group basis, and the information field including a scheduling-related field.

According to a second aspect, the embodiments of the present disclosure provide a method for a secondary cell dormancy indication, applicable to a communication device, the method including:
  transmitting DCI not for scheduling data, an information field in the DCI being used for carrying a dormancy indication, the dormancy indication being used for providing a secondary cell dormancy indication on a per-secondary cell basis, and the information field including a scheduling-related field and a first bit configured for providing a secondary cell dormancy indication on a per-secondary cell group basis.

According to a third aspect, the embodiments of the present disclosure provide a communication device, including:
  a transmission module, configured to transmit first DCI, an information field in the first DCI being used for carrying a dormancy indication, the dormancy indication being used for providing a secondary cell dormancy indication on a per-secondary cell basis or on a per-secondary cell group basis, and the information field including a scheduling-related field.

According to a fourth aspect, the embodiments of the present disclosure provide a communication device, including:
  a transmission module, configured to transmit DCI not for scheduling data, an information field in the DCI being used for carrying a dormancy indication, the dormancy indication being used for providing a secondary cell dormancy indication on a per-secondary cell basis, and the information field including a scheduling-related field and a first bit configured for providing a secondary cell dormancy indication on a per-secondary cell group basis.

According to a fifth aspect, the embodiments of the present disclosure provide a communication device, including a memory, a processor, and a program stored in the memory and executable on the processor, the program, when executed by the processor, implementing steps of the method for a secondary cell dormancy indication according to the first aspect of the embodiments of the present disclosure, or the program, when executed by the processor, implementing steps of the method for a secondary cell dormancy indication according to the second aspect of the embodiments of the present disclosure.

According to a sixth aspect, the embodiments of the present disclosure provide a computer-readable storage medium, storing a computer program, the computer program, when executed by a processor, implementing the method for a secondary cell dormancy indication according to the first aspect of the embodiments of the present disclosure, or the computer program, when executed by a processor, implementing the method for a secondary cell dormancy indication according to the second aspect of the embodiments of the present disclosure.

DETAILED DESCRIPTION

The following clearly describes the technical solutions in the embodiments of the present disclosure with reference to the accompanying drawings in the embodiments of the present disclosure. Apparently, the described embodiments are some of the embodiments rather than all of the embodiments of the present disclosure. All other embodiments derived by a person of ordinary skill in the art based on the embodiments of the present disclosure shall fall within the protection scope of the present disclosure.

In addition, in the specification and claims of this application, the terms "include" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in this specification and the claims represents at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, the term such as "exemplary" or "for example", is intended to present a related concept in a specific manner.

The following describes the embodiments of the present disclosure with reference to the accompanying drawings. A method for a secondary cell dormancy indication and a communication device provided in the embodiments of the present disclosure may be applied to a wireless communication system. The wireless communication system may be a New Radio (NR) system, or the like. For example, an LTE-Advanced (LTE-A) system, a Long Term Evolution (LTE) system, or a subsequent evolved communication system.

Figure 1:
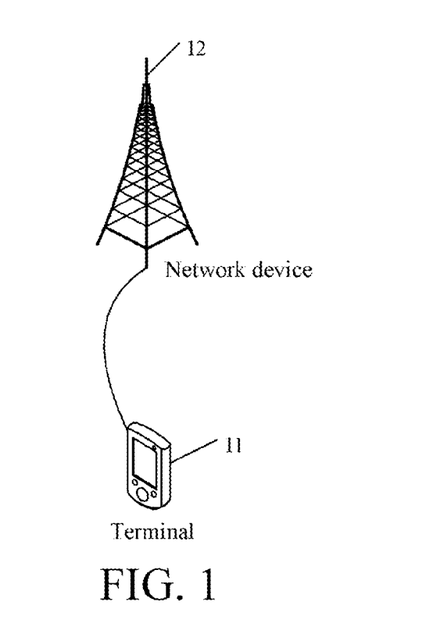
FIG. 1 is a structural diagram of a network system to which the embodiments of the present disclosure may be applied.

FIG. 1 is a structural diagram of a network system to which the embodiments of the present disclosure may be applied. As shown in FIG. 1, the network system includes a terminal 11 and a network device 12. The terminal 11 may be a User Equipment (UE) or other terminal-side devices, such as a mobile phone, a tablet personal computer, a laptop computer, a Personal Digital Assistant (PDA), a Mobile Internet Device (MID), a wearable device, or a robot. It should be noted that the specific type of the terminal 11 is not limited in the embodiments of the present disclosure. The network device 12 may be a 4G base station, a 5G base station, a future-generation base station, or a base station in other communication systems, and may be referred to as a node B, an evolved Node B, a Transmission Reception Point (TRP), an Access Point (AP), or other terms in the field. As long as a same technical effect is achieved, the network device is not limited to a specific technical term. In addition, the network device 12 may be a Master Node (MN) or a Secondary Node (SN). It should be noted that, the 5G base station is used as an example in the embodiments of the present disclosure, but the specific type of the network device is not limited.

Figure 2:
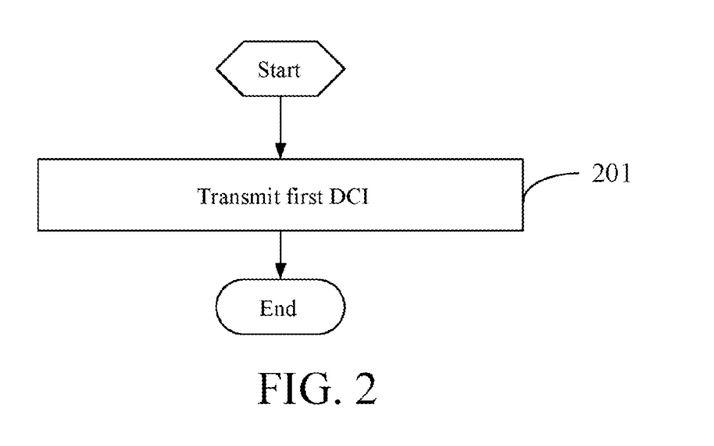
FIG. 2 is a flowchart of a method for a secondary cell dormancy indication according to an embodiment of the present disclosure.

FIG. 2 is a flowchart of a method for a secondary cell dormancy indication according to an embodiment of the present disclosure. The method is applicable to a communication device, as shown in FIG. 2, including the following steps:

Step 201: Transmit first DCI, an information field in the first DCI being used for carrying a dormancy indication, the dormancy indication being used for providing a Secondary Cell (SCell) dormancy indication on a per-secondary cell basis or on a per-secondary cell group basis, and the information field including a scheduling-related field.

The communication device may be a terminal or a network device. Step 201 may be receiving the first DCI in a case that the communication device is the terminal. Step 201 may be sending the first DCI in a case that the communication device is the network device.

That the information field is used for carrying the dormancy indication may be that a bit included in the information field is used for providing the dormancy indication.

That the secondary cell dormancy indication is provided on a per-secondary cell basis may be that the dormancy indication is used for indicating a dormancy behavior of one or more secondary cells, and dormancy behaviors of different secondary cells may be the same or different. Specifically, it may indicate a dormancy behavior of the terminal for one or more secondary cells. For example, the information field is used to provide a bitmap for each configured SCell to indicate a dormancy behavior of each configured SCell, and each configured SCell is arranged in ascending order according to an SCell index. An element in the bitmap having a value of "0" may indicate that an activated downlink bandwidth part (DL BWP) is a dormant bandwidth part (dormant-BWP), indicating that a corresponding SCell enters the dormancy behavior. An element in the bitmap having a value of "1" may indicate that an activated DL BWP is a first non-dormant BWP (first-non-dormant-BWP-ID-for-DCI-inside-active-time) within an activation time indicated by the DCI, indicating that a corresponding SCell enters a non-dormancy behavior. Certainly, the present disclosure is not limited thereto.

The providing a secondary cell dormancy indication on a per-secondary cell group basis may be that the dormancy indication is used for indicating a dormancy behavior of one or more secondary cell groups. Dormancy behaviors of different secondary cell groups may be the same or different, and dormancy behaviors of secondary cells in a same secondary cell group are the same. Specifically, it may indicate a dormancy behavior of the terminal for one or more secondary cell groups. For example, each bit in the bitmap in the information field corresponds to one secondary cell group. A quantity of bits in the bitmap corresponds to a quantity of the secondary cell groups. An element in the bitmap having a value of "0" may indicate that an activated DL BWP is a dormant-BWP, indicating that all Scells in the corresponding secondary cell group enter the dormancy behavior. An element in the bitmap having a value of "1" indicates that an activated DL BWP is the first non-dormant BWP (first-non-dormant-BWP-ID-for-DCI-inside-active-time) indicated by the DCI within the activation time, indicating that all the Scells in the corresponding secondary cell group enter the non-dormancy behavior. Certainly, the present disclosure is not limited thereto.

In the embodiments of the present disclosure, the secondary cell group may include one or more secondary cells, for example, one or more activated secondary cells. Further, the secondary cell group may be configured through Radio Resource Control (RRC) signaling. Alternatively, an expected grouping manner may be reported to a network side through reporting assistance information (UE assistance information) by the terminal, and the network side indicates a grouping manner in signaling according to the suggestion of the terminal. Certainly, the network side may still decide and configure the secondary cell group through signaling. It should be noted that, in the embodiments of the present disclosure, configuration of the secondary cell group is not limited.

In the embodiments of the present disclosure, the dormancy behavior may be a dormant state or a dormancy like behavior.

In addition, in a case that the terminal enters the dormancy behavior, the terminal does not monitor a PDCCH, or the terminal may monitor the PDCCH based on a first period. The first period is greater than a second period. The second period is a monitoring period of monitoring the PDCCH in a case that the terminal does not enter the dormancy behavior.

For example, in the dormancy behavior, the terminal does not monitor the PDCCH or monitor the PDCCH based on a long period according to network-side configuration. For example, the terminal monitors the PDCCH once every 2560 slots. In addition, in the dormancy behavior, the network may configure the terminal whether to perform partial measurement and/or partial reporting of Channel State Information (CSI), beam management, or the like. In the non-dormancy behavior, the terminal monitors the PDCCH more frequently according to the network-side configuration. For example, the PDCCH is monitored in each downlink slot. Moreover, in the non-dormancy behavior, the terminal needs to perform CSI measurement and reporting. Such a behavior leads to high power consumption of the terminal.

The scheduling-related field includes at least one of the following:
a Modulation and Coding Scheme (MCS) field, a New Data Indication (NDI) field, a Demodulation Reference Signal (DMRS) sequence initialization (DMRS sequence initialization) field, a Redundancy Version (RV) field, a Hybrid Automatic Repeat Request (HARQ) process number field (HARQ process number), or an antenna port(s) field (antenna port(s)).

In the embodiments of the present disclosure, in a case that the first DCI is not used for scheduling data, the scheduling-related field in the first DCI may be reused to carry the secondary cell dormancy indication, thereby providing the secondary cell dormancy indication to improve the power-saving effect of the communication device.

As an optional implementation, a format of the first DCI includes: a DCI format 1-2. Certainly, the format of the first DCI is not limited herein. For example, the format of the first DCI may further be another DCI format newly defined by a protocol. Further, the first DCI may be DCI specially used for Ultra Reliable & Low Latency Communication (URLLC). Certainly, the format of the first DCI is not limited herein. For example, the first DCI may be other DCI including the scheduling-related field and not scheduling data.

As an optional implementation, the information field further includes at least one of the following:
a first bit configured for providing the secondary cell dormancy indication on a per-secondary cell group basis; or
a second bit added for providing the secondary cell dormancy indication on a per-secondary cell basis.

The first bit configured for providing the secondary cell dormancy indication on a per-secondary cell group basis may be understood as that the first bit is a bit configured to provide the secondary cell dormancy indication on a per-secondary cell group basis. However, in the first DCI transmitted in step 201, the first bit is used to provide the secondary cell dormancy indication on a per-secondary cell basis, or used to provide the secondary cell dormancy indication on a per-secondary cell group basis. That is, in this implementation, the bit configured for providing the secondary cell dormancy indication on a per-secondary cell group basis may be used to provide the secondary cell dormancy indication on a per-secondary cell basis, or used to provide the secondary cell dormancy indication on a per-secondary cell group basis, thereby increasing the quantity of the secondary cells or the secondary cell groups that may be indicated by the DCI.

For example, in the DCI format 1-1 or 1-2 for simultaneously transmitting data and the Scell dormancy indication function, RRC configures a dormancy indication on a per-secondary cell group basis of the first bit (for example, N bits) for the terminal. Then, the N bits may further be used for a DCI format 1-1 or 1-2 for indicating the Scell dormancy behavior and not for scheduling data, to provide the secondary cell dormancy indication on a per-secondary cell basis or on a per-secondary cell group basis.

For example, in the DCI format 1-2 for simultaneously transmitting data transmission and the Scell dormancy indication function, RRC configures the dormancy indication on a per-secondary cell group basis of the first bit (for example, N bits) for the UE. Then, the N bits may further be used for a DCI format 1-2 for indicating the Scell dormancy behavior and for the scheduling data, to provide the secondary cell dormancy indication on a per-secondary cell group basis.

The second bit added for providing the secondary cell dormancy indication on a per-secondary cell basis may be understood as that the second bit is a bit added to provide the secondary cell dormancy indication on a per-secondary cell basis. However, in the first DCI transmitted in step 201, the second bit is used to provide the secondary cell dormancy indication on a per-secondary cell basis, or used to provide the secondary cell dormancy indication on a per-secondary cell group basis. That is, in this implementation, the bit added for providing the secondary cell dormancy indication on a per-secondary cell basis may be used to provide the secondary cell dormancy indication on a per-secondary cell basis, or used to provide the secondary cell dormancy indication on a per-secondary cell group basis, thereby increasing the quantity of the secondary cells or the secondary cell groups that may be indicated by the DCI.

It should be noted that, the added second bit may be a newly added bit in the DCI in the embodiments of the present disclosure.

For example, in the DCI format 1-2 for simultaneously transmitting data transmission and the Scell dormancy indication function, RRC additionally configures M bits for the terminal to provide a dormancy indication on a per-secondary cell group basis.

In addition, in the embodiments of the present disclosure, the providing a secondary cell dormancy indication on a per-secondary cell group basis may be referred to as a secondary cell group dormancy indication (Scell group dormancy indication), and the providing a secondary cell dormancy indication on a per-secondary cell basis may be referred to as a secondary cell dormancy indication (Scell dormancy indication).

In the implementation, in a case that the scheduling-related field is not sufficient to indicate the secondary cell or the secondary cell group that is to be indicated, the first bit is preferentially used to increase the indication quantity of the secondary cells or the secondary cell groups. In a case that, after the first bit is used, the field is still not sufficient to indicate the secondary cell or the secondary cell group that is to be indicated, the second bit is then used to increase the indication quantity of the secondary cells or the secondary cell groups. Certainly, the present disclosure is not limited thereto. For example: in a case that the scheduling-related field is not sufficient to indicate the secondary cell or the secondary cell group that is to be indicated, the second bit is preferentially used to increase the indication quantity of the secondary cells or the secondary cell groups. In a case that, the second bit is still not sufficient to indicate the secondary cell or the secondary cell group that is to be indicated, the first bit is then used to increase the indication quantity of the secondary cells or the secondary cell groups.

In some embodiments, the dormancy indication includes indication content carried in the scheduling-related field, and includes at least one of the following:

indication content carried in the first bit; or indication content carried in the second bit.

In this implementation, the secondary cell dormancy indication may be provided through the indication content carried in the scheduling-related field and the indication content carried in the first bit. Alternatively, the secondary cell dormancy indication may be provided through the indication content carried in the scheduling-related field and the indication content carried in the second bit. Alternatively, the secondary cell dormancy indication may be provided through the indication content carried in the scheduling-related field, the indication content carried in the first bit, and the indication content carried in the second bit, thereby increasing the quantity of the secondary cells or the secondary cell groups that may be indicated by the DCI.

In some embodiments, at least one of a bit quantity of the first bits or a bit quantity of the second bits is configured by Radio Resource Control (RRC). However, the present disclosure is not limited thereto.

In this implementation, the bit quantity of the first bits may be configured by RRC, the bit quantity of the second bits may be configured by RRC, or the bit quantities of the first bits and the second bits may be configured by RRC. For example: the quantity of the first bits may be 0, 1, 2, 3, 4, or 5 bits, that is, the quantity of the first bits may be greater than or equal to 0 and less than or equal to 5 bits. The quantity of the second bits may be 0, 1, 2, 3, or 4 bits, that is, the quantity of the second bits may be greater than or equal to 0 and less than or equal to 4 bits.

Taking the DCI format 1-2 as an example, the first DCI is illustrated and may be specifically as shown in Table 1:

TABLE 1

DCI format 1-2:
MCS (5 bits)
NDI (1 bit)
DMRS sequence initialization field: (0 or 1 bit)
RV (0, 1, or 2 bits)
HARQ process number field (0, 1, 2, 3, or 4 bits)
antenna port(s) field (0, or 4/5/6 bits)
First bit
Second bit
A minimum usable bit quantity of the bits configured above: 6 bits.

For the first bit and the second bit, reference may be made to the foregoing description, and the details will not be described herein again.

In the embodiments of the present disclosure, first DCI is transmitted. An information field in the first DCI is used for carrying a dormancy indication. The dormancy indication is used for providing a secondary cell dormancy indication on a per-secondary cell basis or on a per-secondary cell group basis. The information field includes a scheduling-related field. In this way, a secondary cell dormancy indication can be provided by reusing the scheduling-related field in the first DCI, to improve the power-saving effect of the communication device.

Figure 3:
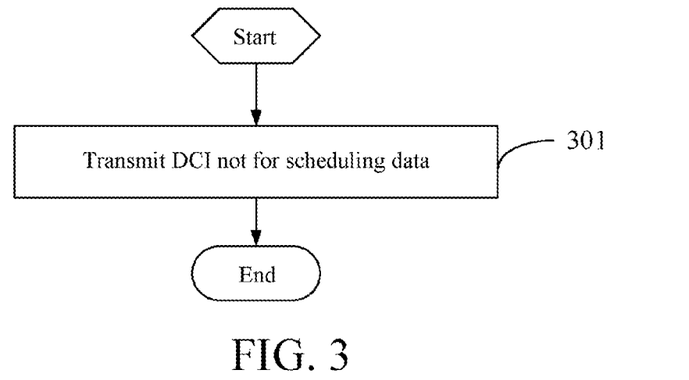
FIG. 3 is a flowchart of another method for a secondary cell dormancy indication according to an embodiment of the present disclosure.

FIG. 3 is a flowchart of another method for a secondary cell dormancy indication according to an embodiment of the present disclosure. The method is applicable to a communication device, as shown in FIG. 3, including the following steps:

Step 301: Transmit DCI not for scheduling data, an information field in the DCI being used for carrying a dormancy indication, the dormancy indication being used for providing a secondary cell dormancy indication on a per-secondary cell basis, and the information field including a scheduling-related field and a first bit configured for providing a secondary cell dormancy indication on a per-secondary cell group basis.

The DCI not for scheduling data may be understood as that the DCI is not used for data scheduling.

In addition, for the communication device, the dormancy indication, the scheduling-related field, and the first bit, reference, reference may be made to the corresponding description of the embodiment shown in FIG. 2, and the details will not be described herein again.

In this embodiment, through the foregoing steps, the scheduling-related field and the first bit configured for providing the secondary cell dormancy indication on a per-secondary cell group basis may be used for providing the dormancy indication on a per-secondary cell basis, to improve the power-saving effect of the communication device, and increase the quantity of the secondary cells indicated by the DCI.

In some embodiments, the dormancy indication includes indication content carried in the scheduling-related field, and includes indication content carried in the first bit configured for providing the secondary cell dormancy indication on a per-secondary cell group basis.

In this implementation, the dormancy indication on a per-secondary cell basis may be provided through the indication content carried in the scheduling-related field and the indication content carried in the first bit configured for providing the secondary cell dormancy indication on a per-secondary cell group basis, to increase the quantity of the secondary cells indicated by the DCI.

In some embodiments, a bit quantity of the first bits configured for providing the secondary cell dormancy indication on a per-secondary cell group basis is configured by RRC.

In some embodiments, a format of the DCI not for scheduling data includes: a DCI format 1-1. Certainly, the present disclosure is not limited thereto. For example, the first DCI format not for scheduling data may further be another DCI format not for scheduling data newly defined by a protocol.

Taking the DCI format 1-1 as an example, the DCI may be as shown in FIG. 2.

TABLE 2

DCI format 1-1:
MCS (5 bits)
NDI (1 bit)
DMRS sequence initialization field: (0 or 1 bit)
RV (2 bits)
HARQ process number field (4 bits)
antenna port(s) field (4/5/6 bits)
First bit
A minimum usable bit quantity of the bits configured above: 16 bits.

For the first bit, reference may be made to the foregoing description, and the details will not be described herein again.

In the embodiments of the present disclosure, DCI not for scheduling data is transmitted. An information field in the DCI is used for carrying a dormancy indication. The dormancy indication is used for providing a secondary cell dormancy indication on a per-secondary cell basis. The information field includes a scheduling-related field and a first bit configured for providing a secondary cell dormancy indication on a per-secondary cell group basis. In this way, a secondary cell dormancy indication can be provided by reusing the scheduling-related field in the DCI not for scheduling data, to improve the power-saving effect of the communication device.

Figure 4:
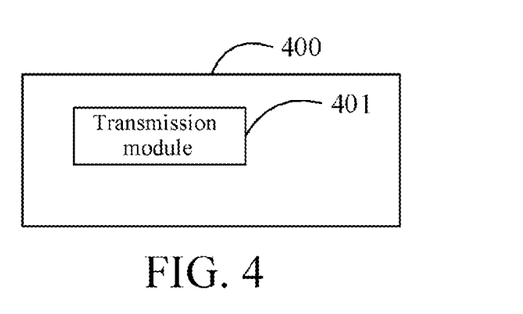
FIG. 4 is a structural diagram of a communication device according to an embodiment of the present disclosure.

FIG. 4 is a structural diagram of a communication device according to an embodiment of the present disclosure. As shown in FIG. 4, a communication device 400 includes:

a transmission module 401, configured to transmit first downlink control information DCI, an information field in the first DCI being used for carrying a dormancy indication, the dormancy indication being used for providing a secondary cell dormancy indication on a per-secondary cell basis or on a per-secondary cell group basis, and the information field including a scheduling-related field.

In some embodiments, the scheduling-related field includes at least one of the following:

a modulation and coding scheme MCS field, a new data indication NDI field, a demodulation reference signal DMRS sequence initialization field, a redundancy version RV field, a hybrid automatic repeat request HARQ process number field, or an antenna port(s) field.

In some embodiments, the information field further includes at least one of the following:

a first bit configured for providing the secondary cell dormancy indication on a per-secondary cell group basis; or a second bit added for providing the secondary cell dormancy indication on a per-secondary cell basis.

In some embodiments, the dormancy indication includes indication content carried in the scheduling-related field, and includes at least one of the following:

indication content carried in the first bit; or indication content carried in the second bit.

In some embodiments, at least one of a bit quantity of the first bits or a bit quantity of the second bits is configured by Radio Resource Control RRC.

In some embodiments, a format of the first DCI includes:

a DCI format 1-2.

The terminal provided in the embodiments of the present disclosure can implement the processes implemented by the terminal in the method embodiment of FIG. 2. To avoid repetition, the details will not be described herein again. Moreover, the power-saving effect of the terminal may be improved.

Figure 5:
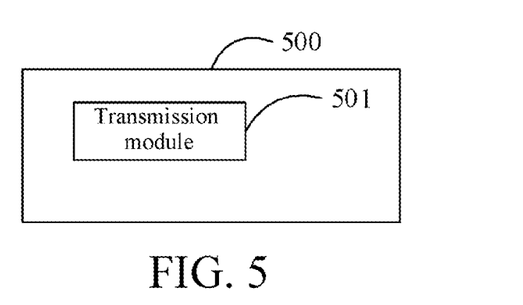
FIG. 5 is a structural diagram of another communication device according to an embodiment of the present disclosure.

FIG. 5 is a structural diagram of another communication device according to an embodiment of the present disclosure. As shown in FIG. 5, a communication device 500 includes:

a transmission module 501, configured to transmit downlink control information DCI not for scheduling data, an information field in the DCI being used for carrying a dormancy indication, the dormancy indication being used for providing a secondary cell dormancy indication on a per-secondary cell basis, and the information field including a scheduling-related field and a first bit configured for providing a secondary cell dormancy indication on a per-secondary cell group basis.

In some embodiments, the dormancy indication includes indication content carried in the scheduling-related field, and includes indication content carried in the first bit configured for providing the secondary cell dormancy indication on a per-secondary cell group basis.

In some embodiments, a bit quantity of the first bits configured for providing the secondary cell dormancy indication on a per-secondary cell group basis is configured by Radio Resource Control RRC.

In some embodiments, a format of the DCI not for scheduling data includes:

a DCI format 1-1.

The terminal provided in the embodiments of the present disclosure can implement the processes implemented by the terminal in the method embodiment of FIG. 3. To avoid repetition, the details will not be described herein again. Moreover, the power-saving effect of the terminal may be improved.

Figure 6:
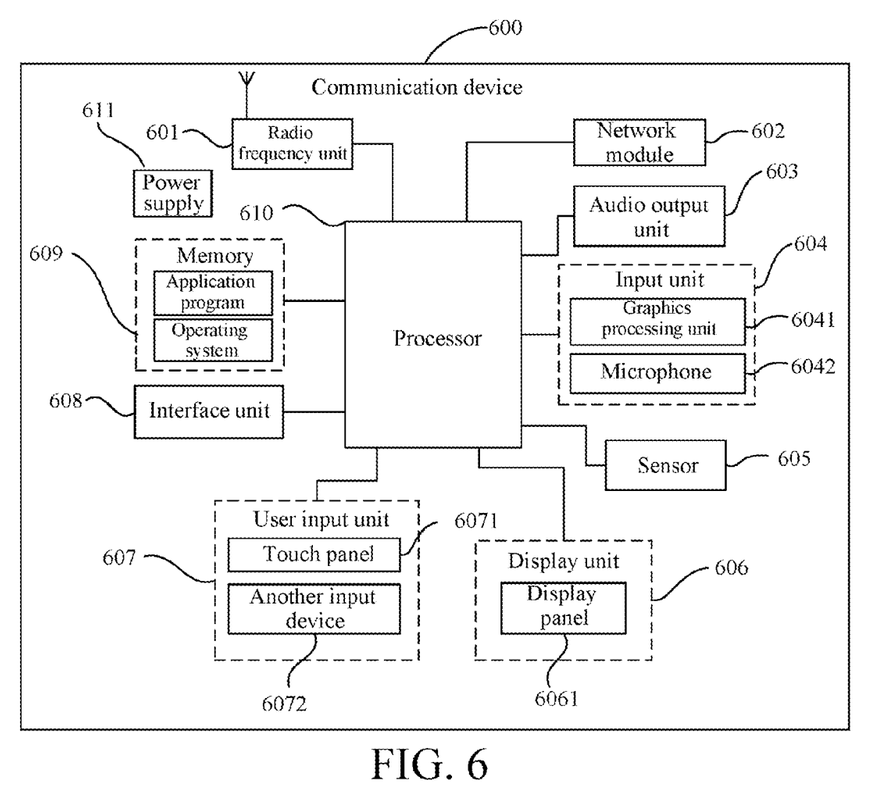
FIG. 6 is a structural diagram of another communication device according to an embodiment of the present disclosure.

FIG. 6 is a schematic diagram of a hardware structure of a communication device according to the embodiments of the present disclosure.

A communication device 600 includes, but is not limited to, components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the communication device shown in FIG. 6 does not constitute a limitation to the communication device, and the communication device may include more or fewer components than those shown in the figure, or some components may be combined, or a different component deployment may be used. In the embodiments of the present disclosure, the communication device includes, but is not limited to, a mobile phone, a tablet computer, a notebook computer, a palmtop computer, an in-vehicle communication device, a robot, a wearable device, a pedometer, and the like.

In an embodiment, the radio frequency unit 601 is configured to transmit first downlink control information DCI, an information field in the first DCI being used for carrying a dormancy indication, the dormancy indication being used for providing a secondary cell dormancy indication on a per-secondary cell basis or on a per-secondary cell group basis, and the information field including a scheduling-related field.

In some embodiments, the scheduling-related field includes at least one of the following:

a modulation and coding scheme MCS field, a new data indication NDI field, a demodulation reference signal DMRS sequence initialization field, a redundancy version RV field, a hybrid automatic repeat request HARQ process number field, or an antenna port(s) field.

In some embodiments, the information field further includes at least one of the following:

a first bit configured for providing the secondary cell dormancy indication on a per-secondary cell group basis; or a second bit added for providing the secondary cell dormancy indication on a per-secondary cell basis.

In some embodiments, the dormancy indication includes indication content carried in the scheduling-related field, and includes at least one of the following:

indication content carried in the first bit; or indication content carried in the second bit.

In some embodiments, at least one of a bit quantity of the first bits or a bit quantity of the second bits is configured by Radio Resource Control RRC.

In some embodiments, a format of the first DCI includes a DCI format 1-2.

In an embodiment: the radio frequency unit 601 is configured to transmit downlink control information DCI not for scheduling data, an information field in the DCI being used for carrying a dormancy indication, the dormancy indication being used for providing a secondary cell dormancy indication on a per-secondary cell basis, and the information field including a scheduling-related field and a first bit configured for providing a secondary cell dormancy indication on a per-secondary cell group basis.

In some embodiments, the dormancy indication includes indication content carried in the scheduling-related field, and includes indication content carried in the first bit configured for providing the secondary cell dormancy indication on a per-secondary cell group basis.

In some embodiments, a bit quantity of the first bits configured for providing the secondary cell dormancy indication on a per-secondary cell group basis is configured by Radio Resource Control RRC.

In some embodiments, a format of the DCI not for scheduling data includes a DCI format 1-1. The communication device may improve the power-saving effect of the communication devices.

It should be understood that, in the embodiments of the present disclosure, the radio frequency unit 601 may be configured to send and receive information or send and receive signals during a call. Specifically, radio frequency unit 601 is configured to receive downlink data from a base station and transmit downlink data to the processor 610 for processing; and send uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may further communicate with another device through a wireless communication system and a network.

The communication device provides a wireless broadband Internet access for a user by using the network module 602, for example, allowing the user to send and receive an email, browse a webpage, and access stream media, or the like.

The audio output unit 603 may convert audio data received by the radio frequency unit 601 or the network module 602 or stored in the memory 609 into an audio signal and output the audio signal as a sound. In addition, the audio output unit 603 may further provide an audio output that is related to a particular function implemented by the communication device 600 (for example, a call signal receiving sound or a message receiving sound). The audio output unit 603 includes a loudspeaker, a buzzer, a receiver, and the like.

The input unit 604 is configured to receive an audio or video signal. The input unit 604 may include a Graphics Processing Unit (GPU) 6041 and a microphone 6042. The graphics processing unit 6041 performs processing on image data of a static picture or a video acquired by an image acquisition device (for example, a camera) in a video acquisition mode or an image acquisition mode. The processed image frame can be displayed on the display unit 606. An image frame processed by the graphics processing unit 6041 may be stored in the memory 609 (or another storage medium) or sent by using the radio frequency unit 601 or the network module 602. The microphone 6042 may receive a sound and can process such a sound into audio data. The processed audio data may be converted, in a phone call mode, into a format that may be sent by the radio frequency unit 601 to a mobile communication base station.

The communication device 600 may further include at least one sensor 605, such as an optical sensor, a motion sensor, and another sensor. Specifically, the optical sensor includes an ambient light sensor and a proximity sensor. The ambient light sensor may adjust luminance of the display panel 6061 according to brightness of the ambient light. The proximity sensor may switch off the display panel 6061 and/or backlight when the communication device 600 is moved to the ear. As one type of motion sensor, an acceleration sensor may detect magnitudes of accelerations in various directions (generally, on three axes), and may detect a magnitude and a direction of the gravity when static, and may be configured to recognize the attitude of communication device (for example, switching between landscape orientation and portrait orientation, a related game, and magnetometer attitude calibration), a function related to vibration recognition (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 606 is configured to display information inputted by the user or information provided for the user. The display unit 606 may include a display panel 6061. The display panel 6061 may be configured in a form of a liquid crystal display (LCD), an organic light-emitting diode (OLED), or the like.

The user input unit 607 may be configured to receive inputted digit or character information, and generate a keyboard signal input related to the user setting and function control of the communication device. Specifically, the user input unit 607 includes a touch panel 6071 and another input device 6072. The touch panel 6071, also referred to as a touchscreen, may collect a touch operation of a user on or near the touch panel (such as an operation of a user on or near the touch panel 6071 by using any suitable object or attachment, such as a finger or a stylus). The touch panel 6071 may include two parts: a touch detection apparatus and a touch controller. The touch detection apparatus detects a touch orientation of the user, detects a signal generated by the touch operation, and transmits the signal to the touch controller. The touch controller receives touch information from the touch detection apparatus, converts the touch information into touch point coordinates, and transmits the touch point coordinates to the processor 610. In addition, the touch controller receives a command transmitted by the processor 610 and executes the command. In addition, the touch panel 6071 may be implemented by using various types, such as a resistive type, a capacitance type, an infrared type, and a surface acoustic wave type. In addition to the touch panel 6071, the user input unit 607 may further include the another input device 6072. Specifically, the another input device 6072 may include, but is not limited to, a physical keyboard, a functional key (such as a volume control key or a switch key), a track ball, a mouse, and a joystick, and the details will not be described herein again.

Further, the touch panel 6071 may cover the display panel 6061. After detecting a touch operation on or near the touch panel, the touch panel 6071 transfers the touch operation to the processor 610, so as to determine a type of the touch event. Then, the processor 610 provides corresponding visual output on the display panel 6061 according to the type of the touch event. In FIG. 6, the touch panel 6071 and the display panel 6061 implement, as two independent parts, input and output functions of the communication device. However, in some embodiments, the touch panel 6071 and the display panel 6061 may be integrated to implement the input and output functions of the communication device, and the details will not be limited herein.

The interface unit 608 is an interface for connecting an external apparatus to the communication device 600. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 608 may be configured to receive an input (such as data information or electric power) from an external apparatus and transmit the received input to one or more elements in the communication device 600 or may be configured to transmit data between the communication device 600 and an external apparatus.

The memory 609 may be configured to store a software program and various data. The memory 609 may mainly include a program storage area and a data storage area. The program storage area may store an operating system, an application program required by at least one function (for example, a sound playback function and an image display function), and the like. The data storage area may store data (for example, audio data and a phone book) created according to the use of the mobile phone. In addition, the memory 609 may include a high speed random access memory, and may further include a non-volatile memory, such as at least one magnetic disk storage device, a flash memory, or another non-volatile solid state storage device.

The processor 610 is a control center of the communication device, and is connected to various parts of the entire communication device by using various interfaces and lines. By running or executing the software program and/or module stored in the memory 609, and invoking data stored in the memory 609, the processor performs various functions and data processing of the communication device, thereby performing overall monitoring on the communication device. The processor 610 may include one or more processing units. For example, the processor 610 may integrate an application processor and a modem processor. The application processor mainly processes an operating system, a user interface, an application, and the like. The modem processor mainly processes wireless communication. It may be understood that the foregoing modem processor may not be integrated into the processor 610.

The communication device 600 may further include the power supply 611 (such as a battery) for supplying power to the components. For example, the power supply 611 may be logically connected to the processor 610 by using a power management system, thereby implementing functions such as charging, discharging, and power consumption management by using the power management system.

In addition, the communication device 600 includes some functional modules that are not shown, which are not described herein again.

For example, the embodiments of the present disclosure further provide a communication device, including a processor 610, a memory 609, and a computer program stored in the memory 609 and executable on the processor 610. When executed by the processor 610, the computer program implements each process of the foregoing embodiments of the method for a secondary cell dormancy indication, and can achieve the same technical effect. To avoid repetition, the details will not be described herein again.

The embodiments of the present disclosure further provide a computer-readable storage medium, storing a computer program, the computer program, when executed by a processor, implementing two methods for a secondary cell dormancy indication provided in the embodiment of the present disclosure, and can achieve the same technical effect. To avoid repetition, the details will not be described herein again. The computer-readable storage medium is, for example, a Read-Only Memory (ROM), a Random Access Memory (RAM), a magnetic disk, or an optical disc.

It should be noted that the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the process, method, object, or apparatus.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of the present disclosure or the part that makes contributions to the related art may be substantially embodied in the form of a software product. The computer software product is stored in a storage medium (for example, a ROM or a RAM, a magnetic disk, or an optical disc), and contains several instructions for instructing a terminal (which may be a mobile phone, a computer, a server, an air conditioner, or a network device) to perform the method described in the embodiments of the present disclosure.

The embodiments of the present disclosure have been described above with reference to the accompanying drawings. The present disclosure is not limited to the specific implementations described above, and the specific implementations described above are merely exemplary and not limitative. A person of ordinary skill in the art may make various variations under the teaching of the present disclosure without departing from the spirit of the present disclosure and the protection scope of the claims, and such variations shall all fall within the protection scope of the present disclosure.

What is claimed is:

1. A method for a secondary cell dormancy indication, performed by a communication device, the method comprising:
   transmitting first downlink control information (DCI) in DCI format 1-2; and
   when the first DCI is not used for scheduling data, reusing a first bit, a second bit, and a scheduling-related field of an information field in the first DCI for providing a secondary cell dormancy indication on a per-secondary cell basis or on a per-secondary cell group basis, wherein
   the first bit is configured for providing the secondary cell dormancy indication on the per-secondary cell group basis; and
   the second bit is added for providing the secondary cell dormancy indication on the per-secondary cell basis.

2. The method according to claim 1, wherein when the communication device is a terminal, transmitting the first DCI in DCI format 1-2 comprises:
   receiving the first DCI in DCI format 1-2.

3. The method according to claim 1, wherein when the communication device is a network device, transmitting the first DCI in DCI format 1-2 comprises:
sending the first DCI in DCI format 1-2.

4. The method according to claim 1, wherein the scheduling-related field comprises at least one of:
a modulation and coding scheme (MCS) field, a new data indication (NDI) field, a demodulation reference signal (DMRS) sequence initialization field, a redundancy version (RV) field, a hybrid automatic repeat request (HARQ) process number field, or an antenna port(s) field.

5. The method according to claim 1, wherein the secondary cell dormancy indication comprises indication content carried in the scheduling-related field, and comprises at least one of:
indication content carried in the first bit; or
indication content carried in the second bit.

6. The method according to claim 1, wherein at least one of a bit quantity of the first bits or a bit quantity of the second bits is configured by Radio Resource Control (RRC).

7. A communication device, comprising: a memory storing a computer program; and a processor coupled to the memory and configured to execute the computer program to perform a method for a secondary cell dormancy indication, the method comprising:
transmitting downlink control information (DCI) in DCI format 1-2 not for scheduling data; and
reusing a first bit, a second bit, and a scheduling-related field of an information field in the DCI for providing a secondary cell dormancy indication on a per-secondary cell basis or on a per-secondary cell group basis, wherein
the first bit is configured for providing the secondary cell dormancy indication on the per-secondary cell group basis; and
the second bit is added for providing the secondary cell dormancy indication on the per-secondary cell basis.

8. The communication device according to claim 7, wherein when the communication device is a terminal, transmitting the DCI in DCI format 1-2 not for scheduling data comprises:
receiving the DCI in DCI format 1-2.

9. The communication device according to claim 7, wherein when the communication device is a network device, transmitting the DCI in DCI format 1-2 not for scheduling data comprises:
sending the DCI in DCI format 1-2.

10. The communication device according to claim 7, wherein the secondary cell dormancy indication comprises indication content carried in the scheduling-related field, and indication content carried in the first bit configured for providing the secondary cell dormancy indication on a per-secondary cell group basis.

11. The communication device according to claim 7, wherein a bit quantity of the first bits configured for providing the secondary cell dormancy indication on a per-secondary cell group basis is configured by Radio Resource Control (RRC).

12. A communication device, comprising: a memory storing a computer program; and a processor coupled to the memory and configured to execute the computer program to perform a method for a secondary cell dormancy indication, the method comprising:
transmitting first downlink control information (DCI) in DCI format 1-2; and
when the first DCI is not used for scheduling data, reusing a first bit, a second bit, and a scheduling-related field of an information field in the first DCI for providing a secondary cell dormancy indication on a per-secondary cell basis or on a per-secondary cell group basis, wherein
the first bit is configured for providing the secondary cell dormancy indication on the per-secondary cell group basis; and
the second bit is added for providing the secondary cell dormancy indication on the per-secondary cell basis.

13. The communication device according to claim 12, wherein when the communication device is a terminal, transmitting the first DCI in DCI format 1-2 comprises:
receiving the first DCI in DCI format 1-2.

14. The communication device according to claim 12, wherein when the communication device is a network device, transmitting the first DCI in DCI format 1-2 comprises:
sending the first DCI in DCI format 1-2.

15. The communication device according to claim 12, wherein the scheduling-related field comprises at least one of:
a modulation and coding scheme (MCS) field, a new data indication (NDI) field, a demodulation reference signal (DMRS) sequence initialization field, a redundancy version (RV) field, a hybrid automatic repeat request (HARQ) process number field, or an antenna port(s) field.

16. The communication device according to claim 12, wherein the secondary cell dormancy indication comprises indication content carried in the scheduling-related field, and comprises at least one of:
indication content carried in the first bit; or
indication content carried in the second bit.

* * * * *